(12) United States Patent
Harb

(10) Patent No.: US 6,298,642 B1
(45) Date of Patent: Oct. 9, 2001

(54) CUTTING BLADE ATTACHMENT FOR ADJUSTABLE HEIGHT STRING TRIMMER HEAD

(76) Inventor: Mitchell A. Harb, P.O. Box 261, Lexington, NC (US) 27293

( * ) Notice: Subject to any disclaimer, the term of this patent is extended or adjusted under 35 U.S.C. 154(b) by 0 days.

(21) Appl. No.: 09/662,762

(22) Filed: Sep. 15, 2000

(51) Int. Cl.[7] .................................................. A01D 34/67
(52) U.S. Cl. .............................................. 56/12.7; 30/276
(58) Field of Search .......................... 56/295, 255, 12.7, 56/17.5; 30/276, DIG. 5, 347

(56) References Cited

U.S. PATENT DOCUMENTS

| | | |
|---|---|---|
| D. 322,791 | 12/1991 | Wada et al. . |
| D. 349,291 | 8/1994 | Forbush . |
| D. 357,482 | 4/1995 | Forbush . |
| 3,049,843 | 8/1962 | Christensen . |
| 3,078,573 | 2/1963 | Kern . |
| 3,103,094 | 9/1963 | Cook . |
| 3,670,413 | 6/1972 | Weber . |
| 4,206,586 | 6/1980 | Zweegers . |
| 4,967,546 | 11/1990 | Forbush . |
| 5,493,785 | * 2/1996 | Lawrence ............................... 30/347 |
| 5,642,609 | 7/1997 | Morrison . |
| 5,813,122 | 9/1998 | Mubareka . |
| 5,862,598 | * 1/1999 | Lee ........................................ 30/276 |
| 6,052,974 | 4/2000 | Harb . |

FOREIGN PATENT DOCUMENTS

2118811-A * 11/1983 (GB) ..................................... 30/276

* cited by examiner

*Primary Examiner*—Thomas B. Will
*Assistant Examiner*—Meredith C. Petravick
(74) *Attorney, Agent, or Firm*—Richard C. Litman

(57) ABSTRACT

A cutting blade is removably attachable to an adjustable height string trimmer assembly for a string trimmer machine. The line holder disc is modified by forming a large diameter concentric flange or shoulder about the central passage thereof, with the cutting blade being modified by forming a central passage therethrough having an essentially equal diameter to the shoulder of the line holder disc. A series of matched bolt holes are also formed through the blade and the line holder disc.

20 Claims, 4 Drawing Sheets

CUTTING BLADE ATTACHMENT FOR ADJUSTABLE HEIGHT STRING TRIMMER HEAD

BACKGROUND OF THE INVENTION

1. Field of the Invention

The present invention relates generally to powered cutting and trimming devices, and more specifically to a circular cutting blade which is adaptable with the adjustable height string trimmer cutting head of U.S. Pat. No. 6,052,974 issued to the present inventor. The adjustable height collar of the string trimmer head is slightly modified to accept the cutting blade and the cutting blade of the present invention attaches to the adjustable height portion of the string trimmer head, thereby allowing the height of the cutting blade to be adjusted as desired. The cutting lines of the string trimmer may be left in place while the cutting blade is installed, thus facilitating the conversion from string trimming to blade use and back to string trimming.

2. Description of the Related Art

The use of circular cutting blades with hand held string trimmer type devices (e.g., Weedeater™) and wheeled cutting machines has been known for some time. These devices are known generically as "brush hogs," among other names and terms, and are generally used for cutting and trimming relatively large diameter and heavy growth for which the relatively fragile and small diameter strings or lines of the string trimmer are not suited.

To this point, such circular cutting blades have been installed upon conventional rotary cutting heads, generally after removing the cutting string or line holder from the head of the machine. In any event, such conventional cutting heads do not provide any height adjustment for any cutting attachment secured thereto, whether a string trimmer attachment or a cutting blade attachment. The user of such an implement must exercise great care when using such a conventional cutting string trimmer machine equipped with a non-adjustable cutting blade attachment, as the precise positioning of the cutting blade at the distal end of a four foot (or more) long power shaft, requires great skill.

This problem is answered by the present invention, a cutting blade attachment which is adaptable to the slightly modified adjustable height trimmer head of the present inventor's previously issued U.S. Pat. No. 6,052,974. The adjustable height collar is modified by machining a centering land on the lower face of the component, and forming a mountng hole of essentially equal diameter in a brush hog type cutting blade. Mounting holes are formed through the blade and threaded into the bottom of the string trimmer collar, with the blade being removably attached to the collar by a series of bolts. This arrangement permits the string trimming or cutting lines to remain in place upon the adjustable portion of the device.

A discussion of the related art of which the present inventor is aware, and its differences and distinctions from the present invention, is provided below.

U.S. Pat. No. 3,049,843 issued on Aug. 21, 1962 to Frank L. Christensen, titled "Abrasive Cutting Devices," describes various embodiments of circular blades adapted for cutting concrete, stone, and similar materials. The Christensen blade embodiments each include diamond impregnated cutting elements at their peripheries and are not suited at all for cutting softer materials such as vegetation, due to the buildup of soft residue which would rapidly clog the very fine grit of the diamond impregnated elements of the Christensen blades. Moreover, the Christensen blades do not have a sufficiently large centering hole for attachment to a large diameter centering disc or shoulder, as provided with the present cutting blade element. Christensen does not disclose any cutting machine to which his blades may be attached, and makes no suggestion of attaching his blades to any form of vegetation cutter, as provided in the present invention.

U.S. Pat. No. 3,078,573 issued on Feb. 26, 1963 to Paul E. Kern, titled "Disk Type Cutter," describes a slotted disc in which the trailing segment of the disc following each of the slots, is offset from the remainder of the disc plane. Kern states that his cutting disc is suited for cutting vegetation, and notes that it may be used with an electric drill or lawn edger (col. 2, lines 35–36). The center mounting hole for the disc is much too small to fit upon the relatively large diameter string trimmer collar of the present invention, and moreover, the radially disposed relief holes cannot be used to secure the Kern blade to another device, due to the planar offset of the blades originating from those holes.

U.S. Pat. No. 3,103,094 issued on Sep. 10, 1963 to to Harry R. Cook, titled "Safety-Type, Rotary Vegetation Cutting Blade," describes a conically shaped blade with cutting elements resembling the blade of the Kern '573 U.S. Patent discussed above. As in the case of the Kern blade, the central mounting hole for the Cook blade is much too small to be adapted to the relatively large diameter adjustable height collar portion of the string trimmer head used with the present cutting blade. Moreover, Cook does not provide any radially disposed attachment holes for securing his blade to a rotary power component, but as in the case of the Christensen and Kern blades discussed above, relies upon a single, central mounting hole for attachment to a rotary power shaft.

U.S. Pat. No. 3,670,413 issued on Jun. 20, 1972 to Edwin J. Weber, titled "Coupling For Tool Element," describes an electrically insulated attachment fitting for securing an elongate cutting blade to an electrically powered trimmer or the like. Weber requires a series of radially disposed upturned clips with his blade, with the clips engaging an insulated hub of circular configuration. Weber discloses both a separate and an integral blade with his radially disposed clip attachment, but a circular blade cannot be used with such an attachment configuration. In any event, the relatively narrow elongate blade cannot contain a relatively large alignment hole through its narrow center, as provided with the circular blade of the present invention, and there is no way of combining the Weber attachment with the adjustable height collar for which the present blade is adapted.

U.S. Pat. No. 4,206,586 issued on Jun. 10, 1980 to Petrus W. Zweegers, titled "Mowing Machine," describes a cutting head assembly having a series of separate, circumferentially disposed cutting knives extending therefrom. The Zweegers assembly provides some limited height adjustment, in that the mounting points for the cutting knives are somewhat helically disposed about the periphery of the generally circular carrier for the assembly. Thus, mounting the knives at different points about the circumference, also changes their positions vertically relative to the axis of the device. However, this adjustment is quite limited due to the shallow slope of the helical angle of the edge of the device, and no practicable means for providing the height adjustment range of the present invention is apparent in the Zweegers disclosure. Moreover, Zweegers uses a series of separate cutting knives, rather than a single circular blade, as in the present invention.

U.S. Pat. No. 4,967,546 issued on Nov. 6, 1990 to Edward Forbush, titled "Mulching Attachment For Lawn Mower,"

describes a ring having a series of vanes (not blades) extending therefrom, with the ring being attachable to the rotary power shaft of a mower above the blade thereof. In one embodiment, the mulching attachment is secured to a collar, which is in turn secured to the power shaft of the mower above the blade element. While this permits vertical adjustment of the mulching attachment and its vanes, the cutting blade is independently attached to the mower power shaft and no vertical adjustment for that blade is provided.

U.S. Pat. No. 5,642,609 issued on Jul. 1, 1997 to Gerald S. Morrison, titled "Multi-Cutting Edge Mulching Lawn Mower Blade," describes a circular blade having a series of radially disposed slots. The slots define a series of separate disc segments, with the segments being alternatingly higher and lower than one another. The leading edges of each segment are sharpened to provide a cutting edge. This blade configuration has no cutting elements or teeth disposed about its circumference, and cannot be used to cut larger vegetation from the side, as provided by the cutting blade of the present invention. Moreover, the Morrison blade has only a single power shaft attachment hole, and cannot be attached to a relatively wide diameter height adjustment collar, as provided by the present cutting blade invention.

U.S. Pat. No. 5,813,122 issued on Sep. 29, 1998 to Aboud Mubareka, titled "Vegetation Control Material Applicator," describes a string trimmer type machine having a circular cutting blade attached thereto. The Mubareka device includes an herbicide solution reservoir beneath the circular blade. The blade secures directly to the power shaft of the machine, rather than securing to a height adjustment assembly which is in turn secured to the power shaft. Accordingly, the blade cannot be secured to the height adjustment assembly of a trimmer having height adjustment means, as provided by the present invention. Moreover, no means is seen to provide for such height adjustment with the Mubareka machine, due to the installation of the herbicide reservoir beneath the blade.

U.S. Pat. No. 6,052,974 issued on Apr. 25, 2000 to Mitchell A. Harb (also the inventor of the invention of the present application), titled "Adjustable Height Head For String Trimmer," describes an attachment assembly for an otherwise conventional string trimmer, which disclosure is incorporated herein in its entirety by reference. The assembly comprises a cylindrical core which is bolted to the power output shaft of the trimmer, with a generally toroidal line holder being secured to the core. The core component has a series of vertical line holder attachment holes in the wall thereof, permitting the line holder to be positioned at any one of the series of heights provided by the holes. However, the Harb '974 U.S. Patent fails to disclose any means for securing a brush cutting blade to this assembly. The present invention comprises a modification of the line holder component to provide a centering flange or collar for a brush cutting blade, and provision of a blade having a wide central opening for concentric installation to the modified line holder component. A series of attachment holes are provided through the blade and the line holder, for bolting the blade to the line holder. This arrangement permits the vertical adjustment of the line holder, and the blade attached thereto, in the same manner as described in the '974 U.S. Patent, without need to remove any line trimming components from the line holder. The cutting blade may thus be easily installed upon and removed from the line holder portion of the device merely by bolting and unbolting a series of bolts, to convert the trimmer for use as a line trimmer or brush cutter.

U.S. Pat. No. D-322,791 issued on Dec. 31, 1991 to Minoru Wada et al., titled "Cutting Wheel For Use In A Mowing Apparatus," illustrates a design comprising two mirror image, stamped sheet components which are assembled together to form a relatively thick construction. Due to the thickness of the construction of the Wada et al. blade, it could not be applied to the trimmer head of the present inventor's issued '974 U.S. Patent as modified in the present disclosure, due to the relatively thin centering flange formed on that trimmer head.

Finally, U.S. Pat. Nos. D-349,291 and D-357,482 issued respectively on Aug. 2, 1994 and Apr. 18, 1995 to Edward Forbush, each titled "Mulcher Blade," disclose two different circular blade designs. The design of the '291 U.S. Patent includes a central passage with a smaller diameter lower shoulder, while the design of the '482 U.S. Patent has a central depression which is closed at its lower end with the exception of a relatively small hole. Both designs have only two diametrically opposed holes, which obviates their attachment to the modified string trimmer collar of the present inventor's '974 U.S. Patent, with its four attachment holes. It is also noted that the blades of the two Forbush design patents are mulching blades for breaking up materials into fine particles. They are not adapted as cutting blades, as the periphery of each blade has at least one axially angled row of teeth which are not adapted for radial cutting.

None of the above inventions and patents, either singly or in combination, is seen to describe the instant invention as claimed.

SUMMARY OF THE INVENTION

The present invention comprises a cutting blade attachment for removable installation to the modified adjustable line holder of the adjustable height string trimmer of U.S. Pat. No. 6,052,974, previously issued to the present inventor, the disclosure of which is incorporated herein by reference. The present invention comprises a modification to the adjustably positionable cutting disc of the '974 U.S. Patent, by forming a centering flange or relief around the open center of the disc. The cutting blade also has a relatively large hole formed centrally therethrough with essentially the same diameter as the flange of the cutting disc. The close fit of the blade onto the flange of the disc assures concentricity of the disc during operation for smooth running.

The cutting blade and trimmer disc each have a series of evenly spaced attachment holes formed therein, with those in the disc being threaded. A corresponding series of bolts are passed through the disc, to thread into the trimmer disc to secure the blade removably thereto. The string trimmer lines and attachments may remain on the trimmer disc during installation of the blade, for ease of conversion from string trimming operation to brush cutting operation and back. The height of the cutting blade is easily adjusted as desired by adjusting the position of the string trimmer disc upwardly or downwardly along the central core of the assembly, and bolting it in position. The present cutting blade may be adapted for use on a wheeled string or line trimmer machine, or on a hand held machine, as desired.

Accordingly, it is a principal object of the invention to provide an improved adjustable height cutting blade assembly for removable installation to a string trimmer type vegetation cutting machine.

An additional object of the invention is to provide an improved adjustable height cutting blade assembly which is particularly adapted for removable installation with a modified string trimmer head as disclosed in U.S. Pat. No. 6,052,974.

It is another object of the invention to provide an improved adjustable height cutting blade assembly which string trimmer head includes a shoulder formed around a central height adjustment passage therethrough, and which cutting blade includes a relatively large diameter central passage which fits closely about the shoulder of the string trimmer head for providing a concentric fit of the blade to the trimmer head.

It is a further object of the invention to provide an improved adjustable height cutting blade assembly including cutting height indicator means disposed upon the central fitting, for adjusting the blade cutting height to a predetermined level as desired.

Still another object of the invention is to provide an improved adjustable height cutting blade assembly which is adaptable to both wheeled and hand held powered string trimmer machines, as desired.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
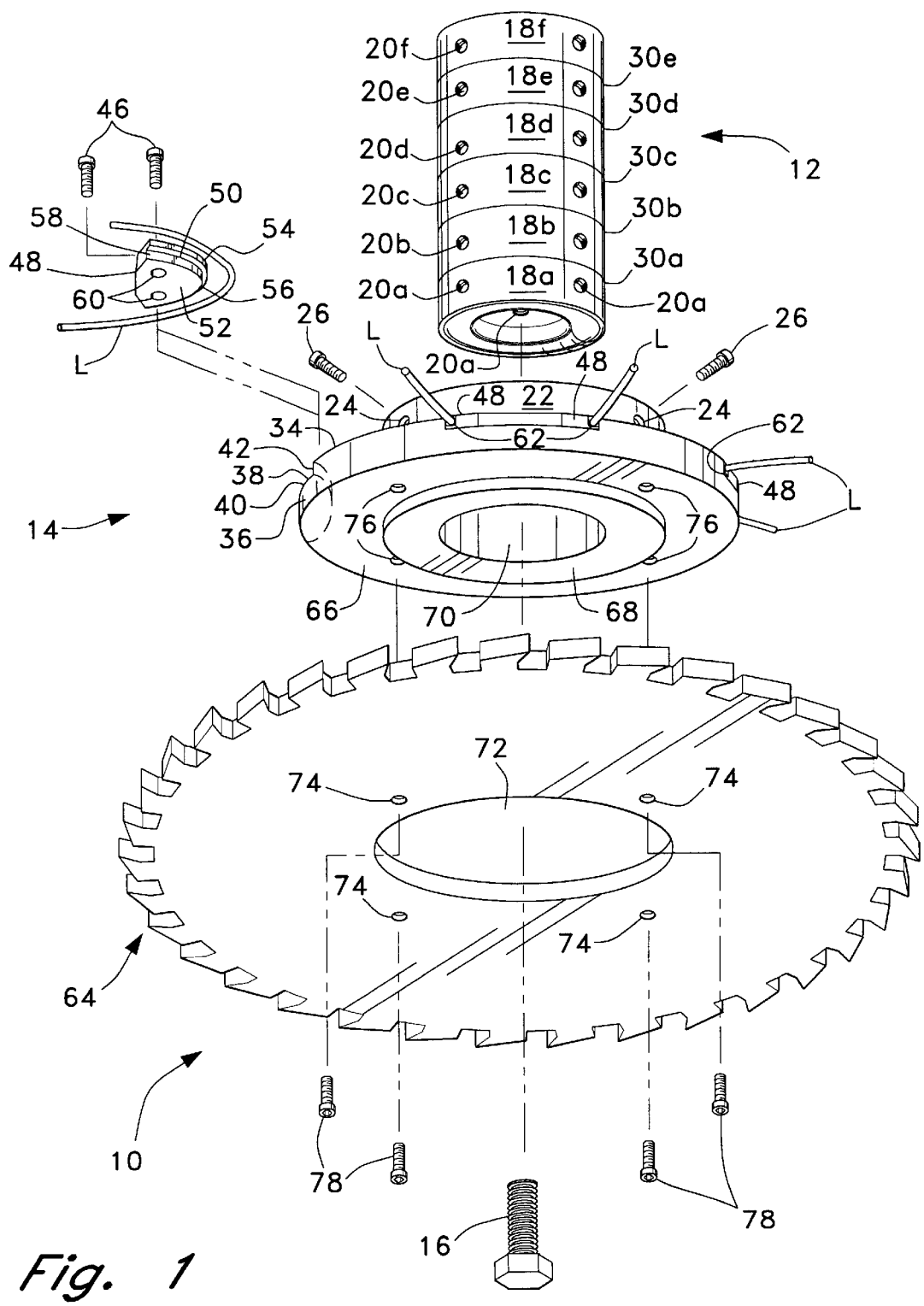
FIG. 1 is an exploded perspective view of the present cutting blade and adjustable height string trimmer head assembly, showing its various features and adjustment means.

The present invention comprises a cutting blade attachment for an adjustable height string trimmer head for a string trimmer type powered grass cutting or trimming machine or the like, with the present trimming head and blade assembly 10 being illustrated in the exploded perspective view of FIG. 1. The present trimming head 10 assembly may be used with various powered devices, with the term "string" being generally descriptive of the plastic (e. g., Nylon, etc.) monofilament line nearly universally used in such machines, and used with the present adjustable trimming head 10. The present invention enables the cutting blade to be removably secured to the remainder of the assembly as desired without requiring removal of the cutting strings or lines, for use either in string trimming grass or other light vegetation or in cutting heavier growth using the cutting blade.

The present adjustable height string trimmer head 10 and blade assembly generally comprises a central core 12 and a height adjustment plate 14 removably and adjustably securable to the core 12. These two components 12 and 14 generally provide for the positive locking of the position of the height adjustment plate 14 to the core 12, at any one of a series of discrete heights along the core 12, as desired.

The central core 12 is of generally cylindrical configuration, and includes a conventional diametric plate therein (not shown) having a bolt attachment hole formed therethrough. The central core component 12 is thus removably installable to the output shaft of a conventional string trimmer machine, by means of passing the bolt 16 through the conventional bolt attachment hole of the core 12, and securing the bolt 16 conventionally in the output shaft (not shown) of the trimming machine.

The core 12 includes a series of circumferentially disposed rows 18a through 18f of unthreaded height adjustment holes 20a–20f formed through the wall thereof, with each row 18a through 18f having a series of height adjustment holes, respectively 20a through 20f, evenly spaced circumferentially about the cylindrical central core 12. It will be seen that more or fewer such rows 18a through 18f and holes 20a through 20f may be provided, as desired, with spacing therebetween as desired. only the bottom row of three holes 20a is shown completely in FIG. 1 due to the perspective of the drawing Figure, but it will be seen that the other rows 18b through 18f each contain an identical number of three holes each.

The height adjustment plate 14 includes an integral locking collar 22, with the collar 22 fitting closely about the outer diameter of the central core 12 and containing a single circumferentially disposed row of threaded attachment holes 24 formed therethrough. The locking collar attachment holes 24 will align with the holes of any one of the height adjusting hole rows 18a through 18f, depending upon the position of the height adjustment plate 14 and its locking collar 22 relative to the rows 18a through 18f of locking holes 20a through 20f in the central core 12. While a series of three evenly spaced locking collar attachment holes 24 are provided, circumferentially spaced at one hundred twenty degrees apart from one another to match the circumferential spacing of each row of height adjusting holes, it will be seen that more or fewer such attachment holes may be provided, with a corresponding number of holes being provided in each of the rows 18a through 18f. However, a series of three locking collar attachment holes 24, and three holes in each of the rows 18a through 18f, is optimum for proper alignment of the components 12 and 14, while still providing relatively quick and simple adjustment.

A series of collar attachment bolts 26 is provided for securing the locking collar 22, and thus the height adjusting plate 14, to the central core 12. The bolts 26 need not be completely removed from the locking collar 22 for adjustment of the plate 14 upwardly or downwardly along the central core 12, but need only be loosened a few turns to the point that their inner ends clear the wall of the central core 12 for the plate 14 to be adjusted relative to the core 12.

The central core 12 may include means for facilitating precise height adjustment of the height adjusting plate 14 thereon. A series of height indicator numbers (not shown, but provided in the '974 U.S. Patent previously issued to the present inventor) may be provided along the length of the core 12, adjacent to corresponding ones of the height adjustment holes 20a through 20d. Corresponding plate height adjustment indicator lines 30a through 30e may also be provided circumferentially about the core 12. To adjust the height of the plate 14 to the desired level, one need only loosen the collar locking screws 26 as required, slide the plate 14 and its integral locking collar 22 upwardly or downwardly along the central core 12 and align the upper edge of the locking collar 22 with the corresponding line 30a through 30d of the cutting height desired, and secure the collar locking bolts 26 through the corresponding row 18a through 18d of holes 20a through 20d in the core 12.

Figure 2:
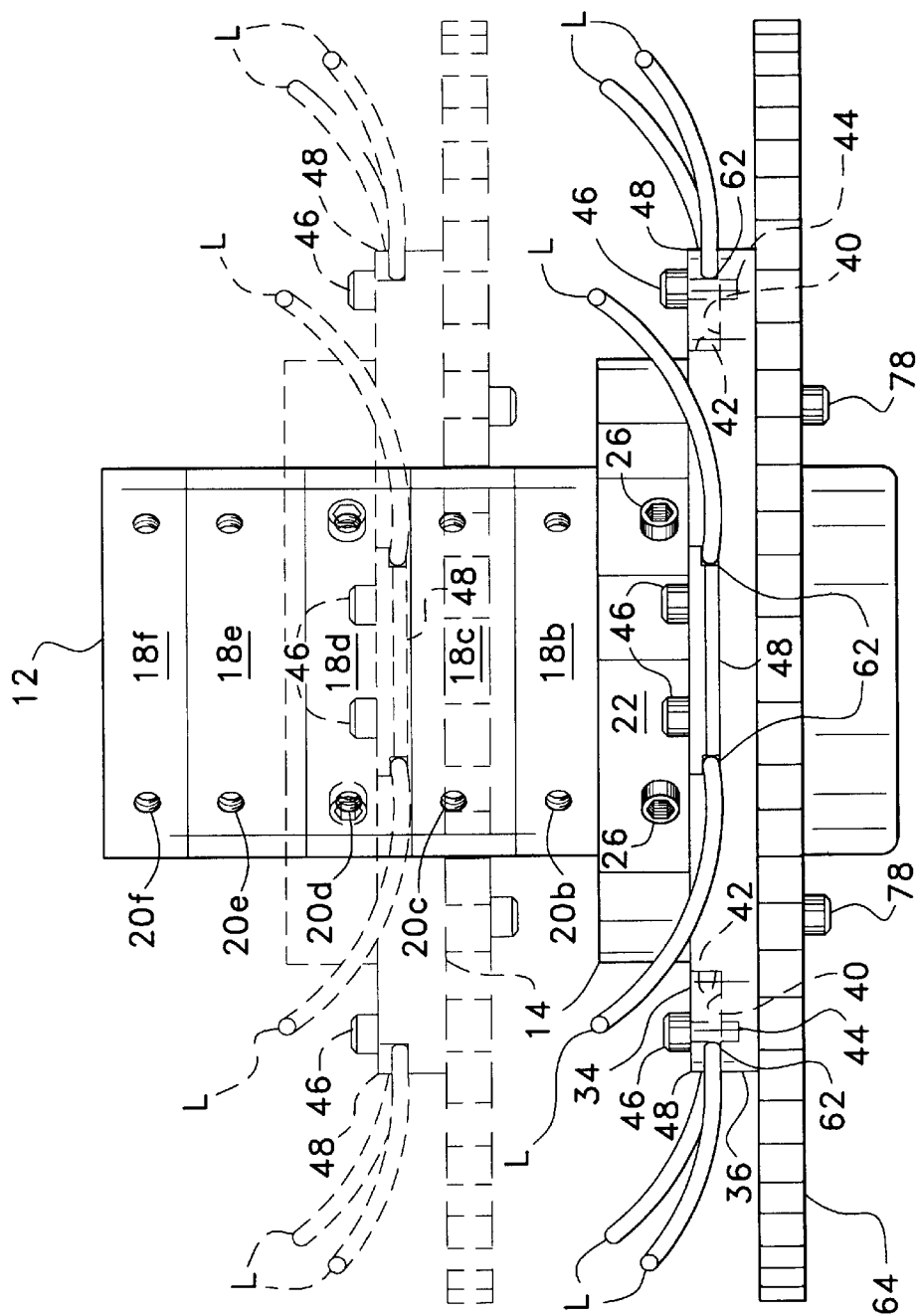
FIG. 2 is a side elevation view of the assembly of FIG. 1, showing the adjustment of the string trimmer collar and attached cutting blade on the central core of the assembly.

The outer portion of the adjuster plate 14 comprises a trimmer line attachment disc 32, which is formed integrally with the locking collar 22 as a single, unitary component. The trimmer line disc 32 includes a series of trimmer line attachment means formed in the upper surface 34 and disposed about the periphery 36 thereof, as shown in FIGS. 1 and 2 of the drawings. Preferably, a series of four trimmer line attachment means is evenly distributed about the periphery 36 of the trimmer line attachment disc 32, but more or fewer such line attachment means may be provided as desired. The line attachment means are evenly distributed about the periphery 36 of the disc 32 for proper balance of the assembly. One is not visible in FIGS. 1 and 2, due to the perspective of the views.

Each of the trimmer line attachment means or elements is essentially identical to one another, with details shown in the exploded view of the left hand attachment assembly of FIG. 1. Each line attachment means, element, or assembly includes a generally semicircular line attachment seat 38 machined or otherwise formed in the upper surface 34 of the periphery 36 of the line attachment disc portion 32 of the height adjusting plate 14. The seat 38 has a floor 40 which is lower than the upper surface 34 of the line attachment disc 32, and an inner peripheral wall 42, defining the innermost portion of the seat 38. Two threaded trimmer line clamping plate bolt attachment holes 44 are formed in the floor 40 of the seat, for the removable installation of a pair of trimmer line clamping plate attachment bolts 46; these features 40 through 44 are more clearly shown in the present inventor's '974 previously issued U.S. Patent.

A trimmer line clamping plate 48 is removably and adjustably secured within the seat 38. The plate 48 is formed of a flat sheet of material with an upper surface 50 and opposite lower surface 52, and is configured to fit closely within the corresponding seat area 38 of the disc 32, with an inner edge 54 which is congruent to and abuts the seat wall 42 when the clamping plate 48 is secured within the seat 38 by means of the two bolts 46. The clamping plate 48 includes a trimmer line groove 56 machined or otherwise formed at the juncture of the lower surface 52 and inner edge 54 of the plate 48. This groove 56, along with the inner edge of the seat floor 40 and the inner wall 42 of the clamping plate or line attachment seat 38, define a trimmer line passage 58 for positively and immovably clamping a trimmer line L therein.

Each of the trimmer line clamping plates 48 includes a pair of unthreaded bolt holes 60 formed therethrough, with the bolt holes 60 aligning with the trimmer line clamping plate bolt attachment holes 44 of the seat 38 when the clamping plate 48 is secured to the seat, thereby clamping the trimmer line L in the passage 58 between the lower inner edges of the clamping plate 48 and seat 38.

The semicircular, generally U-shaped configuration of the trimmer line passage 58 results in each passage 58 having two end openings 62 at the periphery 36 of the line attachment disc 32 portion of the height adjustment plate 14. Thus, only four separate sections of trimmer line L are required to provide eight extended ends E, thus providing considerable cutting and trimming power for the present height adjustable trimmer head 10.

The present height adjustable trimmer 10 includes other features which make it a more versatile tool than that of the previously noted '974 issued U.S. Patent, and/or any other prior art. The present trimmer 10 also includes means for removably attaching a circular vegetation cutting blade 64 to the height adjusting plate 14, thus allowing the height of the cutting blade 64 to be adjusted by adjusting the plate 14 relative to the central core 12, as discussed in detail further above. The lower or bottom surface 66 of the height adjusting plate 14 includes a relatively large diameter concentric shoulder or flange 68 which depends from the lower surface 66 of the plate 14 and immediately adjacently surrounds the central passage 70 formed through the collar 22 for installation on the core 12, as shown in FIG. 1.

The cutting blade 64 includes a large diameter concentric passage 72 formed therethrough, with the passage 72 diameter being essentially the same as the outer diameter of the flange 68 which extends from the lower surface 66 of the trimmer height adjustment disc 14. This assures a very close and concentric fit for the blade 64 when it is installed upon the lower surface 66 of the disc 14, thereby precluding any vibration or irregular operation due to the blade being off center relative to the rest of the assembly.

A plurality (preferably four) of equally spaced bolt holes 74 is provided through the blade 64, with a like number of positionally matched threaded blade attachment holes 76 being provided through the trimmer line attachment disc 34. A like number of blade attachment bolts 78 are used to secure the blade 64 removably to the bottom of the disc 34, for brush cutting operations as desired. It will be seen that this arrangement of removably attaching the blade 64 to the bottom surface 66 of the trimmer adjustment disc 34, allows the blade 64 to be secured to or removed from the disc 34 without disturbing either the attachment of the trimmer lines L, or the cutting height of the assembly. Conversely, the lengths of the trimmer lines L, and/or the cutting height of the assembly, may be easily adjusted with the cutting blade 64 either installed upon or removed from the assembly. As the periphery of the cutting blade 64 extends well past the circle defined by the path of the cutting lines L, it will be seen that the lines L may be left in place with no significant additional wear during brush cutting operations using the circular blade 64.

In summary, the present adjustable height string trimmer head provides a much needed and convenient means of precisely adjusting the cutting height of the trimmer head in such a device. The present adjustable head may be formed of a variety of materials, with relatively strong and yet lightweight materials being preferred in order to provide the desired durability and yet reduce the rotating mass and inertia of the trimmer head. Aluminum is a particularly suitable material, with the central core, height adjustment plate, and each of the trimmer line clamping plates preferably being formed of aluminum.

Figure 3:
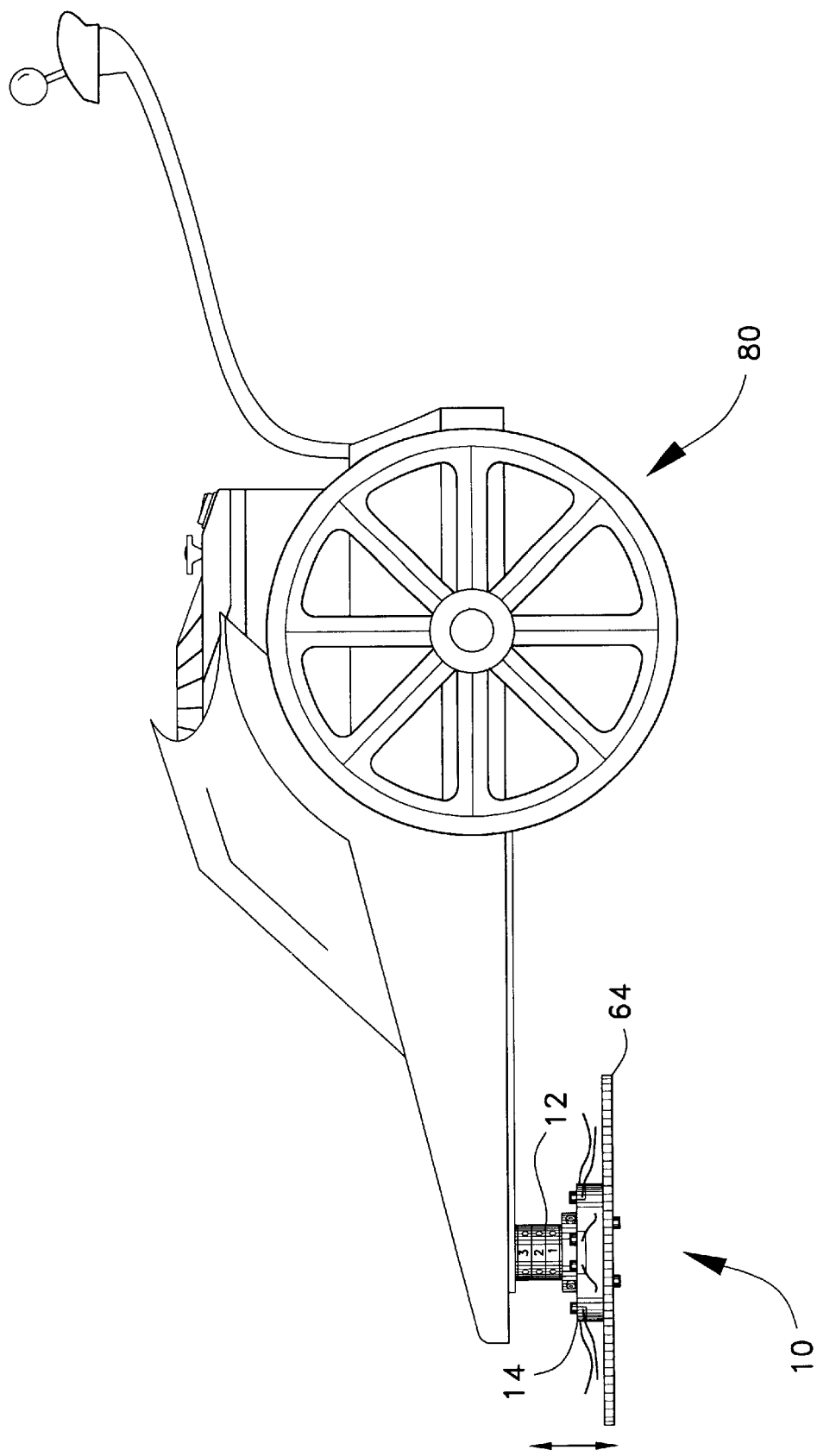
FIG. 3 is a side elevation view of the present cutting blade and adjustable height string trimmer head assembly installed upon a wheeled trimmer machine.
Figure 4:
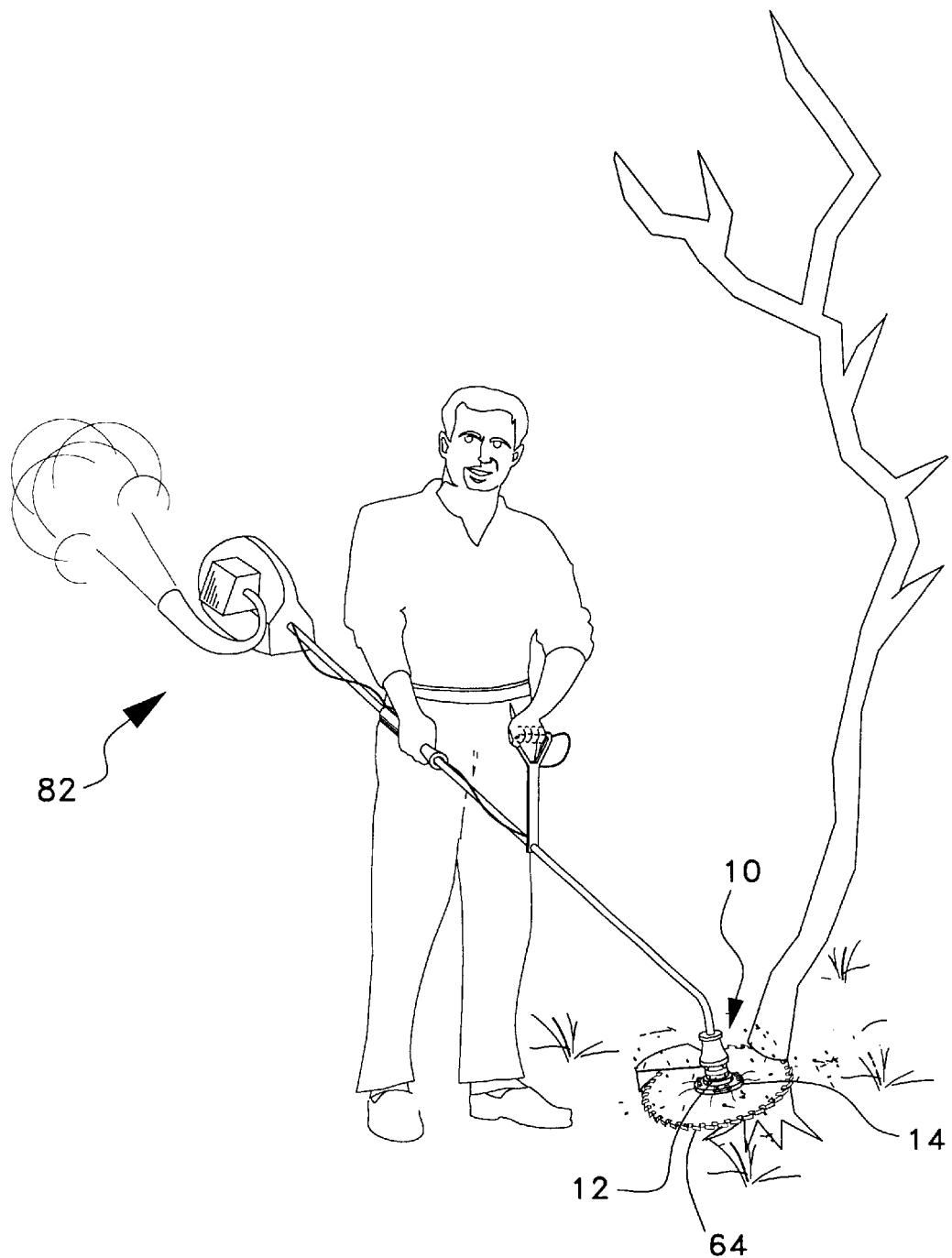
FIG. 4 is an environmental perspective view of the present cutting blade and adjustable height string trimmer head assembly installed upon a hand held trimmer machine in use.

The present adjustable trimmer head is particularly suitable for use with an otherwise conventional wheeled motorized (e. g., internal combustion engine, electric motor, etc.) string trimmer machine, such as the machine 80 illustrated generally in FIG. 3 of the drawings. Such wheeled machines 80 are particularly advantageous with the present adjustable trimmer head, in that they provide an essentially level cutting plane at all times for the trimmer head, thus providing an extremely even cut for such filament or string trimmer cutting heads. However, the present adjustable head may also be adapted for use with hand held string trimming machines, such as the machine 82 of FIG. 4 with which the present adjustable trimmer head is shown being used. It will be noted that in both FIGS. 3 and 4, the respective machines 80 and 82 are illustrated with the circular vegetation or brush cutting blade 64 of the present invention, installed thereon and in use.

Cutting height adjustment for the assembly, either for using the trimmer lines L or the blade 64, is quickly and easily accomplished by loosening the height adjusting bolts securing the locking collar to the central core, sliding the locking collar and its integral trimmer line attachment disc upwardly or downwardly along the central core to the desired position, and tightening the bolts. The novel provision of bolts which pass radially through holes in the adjustable locking collar and also into mating threaded passages in the central core, result in the positive locking of the collar (and thus the trimmer line attachment disc) to the central core, with no possibility of slippage and resulting uneven trimming or loss of the attachment disc from the core. The configuration of the attachment disc, with its even distribution of the trimmer line attachment means therearound, also results in better balance and greatly reduced vibration for the assembly.

Adjustment or replacement of the trimmer lines is also easily accomplished, by merely loosening the two clamping screws securing each clamping plate to its respective seat in the trimmer line plate. Again, if the cutting blade 64 is installed, it need not be removed to accomplish such trimmer line adjustment or replacement. The clamping screws need not be completely removed, but merely loosened sufficiently to allow the plate to loosen its grip on the underlying trimmer line. The old line may then be pulled out of the line clamping passage, and a new line inserted through one of the end openings of the passage. If the line has completely broken off at each passage, it is still not necessary to remove the clamping plate completely. Again, the mere loosening of the clamping bolts or screws releases the clamping pressure on the line. The new line may be inserted in one of the end openings of the passage, and used to push the old line at least partially from the opposite end opening where it may be grasped for removal. Line replacement may be accomplished in only moments using the present adjustable trimmer head, with much less time being required for the replacement of a line which has broken off at the periphery of the trimmer line disc, than with other prior art line trimmer heads.

Accordingly, the present adjustable height string trimmer head will be greatly appreciated by those who value their time in performing grass cutting and trimming work, and who appreciate the precision provided by the present invention in providing a uniform and precise cut for a lawn or similar surface. The additional provision for the removable attachment of a circular brush cutting blade to the assembly, provides even greater versatility for the present adjustable height cutting device.

It is to be understood that the present invention is not limited to the sole embodiment described above, but encompasses any and all embodiments within the scope of the following claims.

I claim:

1. An adjustable height string trimmer head and cutting blade attachment therefor, comprising in combination:

a generally cylindrical central core, for conventionally removably securing to a string trimmer machine;

said central core including a plurality of circumferentially disposed rows of height adjustment holes therein, with each of said rows including a plurality of evenly spaced holes therein;

a height adjustment plate for adjustably and removably securing to said central core;

said plate comprising a locking collar having a passage therethrough for removably, positively, and adjustably securing to said central core, and a trimmer line attachment disc formed integrally therewith and extending outwardly therefrom;

said locking collar including a single circumferential row of attachment holes therethrough, with said locking collar attachment holes selectively aligning with said evenly spaced holes of each of said rows of said height adjustment holes of said central core when said locking collar is installed thereon;

said trimmer line attachment disc including at least an upper surface, a lower surface opposite said upper surface, and a periphery with a plurality of trimmer line attachment means disposed therearound;

said trimmer line attachment disc further including a large diameter concentric flange depending from said lower surface thereof and immediately adjacent said passage of said collar;

a cutting blade including a concentric passage having a diameter substantially equal to said flange of said trimmer line attachment disc, for fitting closely and concentrically therearound; and said cutting blade and said trimmer line attachment disc each having a plurality of matching attachment holes formed therein, for removably securing said cutting blade to said trimmer line attachment disc.

2. The adjustable height string trimmer head and cutting blade attachment combination according to claim 1, wherein said cutting blade is a circular vegetation cutting blade.

3. The adjustable height string trimmer head and cutting blade attachment combination according to claim 1, wherein said plurality of matching attachment holes of said cutting blade and said trimmer line attachment disc comprise four equally spaced holes formed through said cutting blade and four equally spaced threaded holes formed in said trimmer line attachment disc.

4. The adjustable height string trimmer head and cutting blade attachment combination according to claim 1, wherein each of said trimmer line attachment means comprises:

a generally semicircular seat formed in said upper surface of said periphery of said trimmer line attachment disc;

said seat having a floor and an inner peripheral wall;

said seat further having two threaded trimmer line clamping plate bolt attachment holes formed therein;

a trimmer line clamping plate having an upper surface, an opposite lower surface, and an inner edge congruent to and abutting said seat wall when said clamping plate is secured to said seat;

said lower surface and said inner edge of said clamping plate including a trimmer line groove formed therein, with said trimmer line groove of said clamping plate and said floor and said inner peripheral wall of said seat defining a trimmer line passage for positively and immovably clamping a trimmer line therein when said clamping plate is secured to said seat, with said trimmer line passage having two end openings thereto for extending two ends of a trimmer line therefrom;

said trimmer line clamping plate further including two unthreaded bolt holes formed therethrough and aligning with said trimmer line clamping plate bolt attachment holes of said seat when said trimmer line clamping plate is secured to said seat; and two trimmer line clamping plate attachment bolts for adjustably and removably securing said trimmer line clamping plate to said seat, by means of said bolt holes of said trimmer line clamping plate and said attachment holes of said seat.

5. The adjustable height string trimmer head and cutting blade attachment combination according to claim 1, wherein said trimmer line attachment means are evenly spaced and positioned about said trimmer line attachment disc for proper balance thereof.

6. The adjustable height string trimmer head and cutting blade attachment combination according to claim 1, wherein said plurality of trimmer line attachment means comprises four evenly spaced and positioned trimmer line attachment elements, with each of said elements having two trimmer line ends extending generally radially therefrom.

7. The adjustable height string trimmer head and cutting blade attachment combination according to claim 1, including a plurality of height adjustment indicator lines disposed upon said central core, with each of said indicator lines corresponding to one of said rows of height adjustment holes thereof.

8. The adjustable height string trimmer head and cutting blade attachment combination according to claim 1, including a plurality of trimmer line clamping plates, wherein said central core, said height adjustment plate, and said trimmer line clamping plates are each formed of aluminum.

9. The adjustable height string trimmer head and cutting blade attachment combination according to claim 1, including a wheeled motorized string trimmer machine for removably attaching and using said central core, said height adjustment plate, said trimmer line attachment means, and said cutting blade therewith.

10. The adjustable height string trimmer head and cutting blade attachment combination according to claim 1, including a hand held motorized string trimmer machine for removably attaching and using said central core, said height adjustment plate, said trimmer line attachment means, and said cutting blade therewith.

11. An adjustable height string trimmer head and cutting blade attachment therefor, comprising in combination:
  a generally cylindrical central core, for conventionally removably securing to a string trimmer machine;
  a height adjustment plate for adjustably and removably securing to said central core;
  said central core and said height adjustment plate including cooperating height adjustment means for adjustably securing said height adjustment plate to said central core as desired;
  said plate including a trimmer line attachment disc formed integrally therewith and extending outwardly therefrom;
  said trimmer line attachment disc including at least an upper surface, a lower surface opposite said upper surface, and a periphery with a plurality of trimmer line attachment means disposed therearound;
  each of said trimmer line attachment means comprising a generally semicircular seat formed in said upper surface of said periphery of said trimmer line attachment disc;
  said seat having a floor and an inner peripheral wall;
  said seat further having two threaded trimmer line clamping plate bolt attachment holes formed therein;
  a trimmer line clamping plate having an upper surface, an opposite lower surface, and an inner edge congruent to and abutting said seat wall when said clamping plate is secured to said seat;
  said lower surface and said inner edge of said clamping plate including a trimmer line groove formed therein, with said trimmer line groove of said clamping plate and said floor and said inner peripheral wall of said seat defining a trimmer line passage for positively and immovably clamping a trimmer line therein when said clamping plate is secured to said seat, with said trimmer line passage having two end openings thereto for extending two ends of a trimmer line therefrom;
  said trimmer line clamping plate further including two unthreaded bolt holes formed therethrough and aligning with said trimmer line clamping plate bolt attachment holes of said seat when said trimmer line clamping plate is secured to said seat;
  two trimmer line clamping plate attachment bolts for adjustably and removably securing said trimmer line clamping plate to said seat, by means of said bolt holes of said trimmer line clamping plate and said attachment holes of said seat;
  said trimmer line attachment disc further including a large diameter concentric flange depending from said lower surface thereof and immediately adjacent said passage of said collar;
  a cutting blade including a concentric passage having a diameter substantially equal to said flange of said trimmer line attachment disc, for fitting closely and concentrically therearound; and
  said cutting blade and said trimmer line attachment disc each having a plurality of matching attachment holes formed therein, for removably securing said cutting blade to said trimmer line attachment disc.

12. The adjustable height string trimmer head and cutting blade attachment combination according to claim 11, wherein said cutting blade is a circular vegetation cutting blade.

13. The adjustable height string trimmer head and cutting blade attachment combination according to claim 11, wherein said plurality of matching attachment holes of said cutting blade and said trimmer line attachment disc comprise four equally spaced holes formed through said cutting blade and four equally spaced threaded holes formed in said trimmer line attachment disc.

14. The adjustable height string trimmer head and cutting blade attachment combination according to claim 11, wherein said cooperating height adjustment means for adjustably securing said height adjustment plate to said core, comprises:
  a plurality of circumferentially disposed rows of height adjustment holes formed in said central core, with each of said rows including a plurality of evenly spaced holes therein;
  said height adjusting plate including a locking collar for removably, positively, and adjustably securing to said core; and
  said locking collar including a single circumferential row of attachment holes therethrough, with said locking collar attachment holes selectively aligning with said evenly spaced holes of each of said rows of said height adjustment holes of said central core when said locking collar is installed thereon.

15. The adjustable height string trimmer head and cutting blade attachment combination according to claim 12, including a plurality of height adjustment indicator lines disposed upon said central core, with each of said indicator lines corresponding to one of said rows of height adjustment holes thereof.

16. The adjustable height string trimmer head and cutting blade attachment combination according to claim 11, wherein said trimmer line attachment means are evenly spaced and positioned about said trimmer line attachment disc for proper balance thereof.

17. The adjustable height string trimmer head and cutting blade attachment combination according to claim 11, wherein said plurality of trimmer line attachment means comprises four evenly spaced and positioned trimmer line attachment elements, with each of said elements having two trimmer line ends extending generally radially therefrom.

18. The adjustable height string trimmer head and cutting blade attachment combination according to claim 11, wherein said central core, said height adjustment plate, and each said trimmer line clamping plate are formed of aluminum.

19. The adjustable height string trimmer head and cutting blade attachment combination according to claim 11, including a wheeled motorized string trimmer machine for removably attaching and using said central core, said height adjustment plate, said trimmer line attachment means, and said cutting blade therewith.

20. The adjustable height string trimmer head and cutting blade attachment combination according to claim 11, including a hand held motorized string trimmer machine for removably attaching and using said central core, said height adjustment plate, said trimmer line attachment means, and said cutting blade therewith.

* * * * *